US012252106B2

(12) United States Patent
Lauman et al.

(10) Patent No.: US 12,252,106 B2
(45) Date of Patent: Mar. 18, 2025

(54) BRAKE SYSTEM FOR VEHICLE AND METHOD OF CONTROLLING BRAKE SYSTEM

(71) Applicant: HL MANDO CORPORATION, Gyeonggi-do (KR)

(72) Inventors: Jeff Lauman, Bay City, MI (US); Bryan Freed, Bay City, MI (US); Jeremy Dobbs, Bay City, MI (US); Ed Fullman, Bay City, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 272 days.

(21) Appl. No.: 17/710,974

(22) Filed: Mar. 31, 2022

(65) Prior Publication Data

US 2023/0311823 A1   Oct. 5, 2023

(51) Int. Cl.
*B60T 8/17* (2006.01)

(52) U.S. Cl.
CPC ..................... *B60T 8/17* (2013.01)

(58) Field of Classification Search
CPC ............ B60T 8/17; B60T 8/172; B60T 13/74; B60Y 2400/81

USPC ........................................................ 701/70
See application file for complete search history.

(56) References Cited

FOREIGN PATENT DOCUMENTS

| JP | 5043963 | 7/2012 |
|----|---------|--------|
| JP | 5862436 | 1/2016 |
| JP | 2017193264 A | * 10/2017 |

* cited by examiner

*Primary Examiner* — Lindsay M Low
*Assistant Examiner* — Omar Morales
(74) *Attorney, Agent, or Firm* — WOMBLE BOND DICKINSON (US) LLP

(57) ABSTRACT

A brake system for a vehicle is configured to mix a brake request signal corresponding to a level of a brake request with a variable frequency and a variable amplitude (e.g. torque tickle) when generating a signal for controlling a brake. The brake system comprises: one or more brakes configured to apply braking to one or more vehicle wheels; memory; and a processor configured to mix a brake request signal corresponding to a level of a brake request with a variable frequency and a variable amplitude to generate a signal for controlling the one or more brakes, wherein the variable frequency is retrieved from one or more predetermined frequencies stored in the memory, and the variable amplitude is calculated based on the level of the brake request.

18 Claims, 7 Drawing Sheets

BRAKE SYSTEM FOR VEHICLE AND METHOD OF CONTROLLING BRAKE SYSTEM

BACKGROUND

The present disclosure generally relates to an apparatus and method for controlling a vehicle. More specifically, some embodiments of the present disclosure relate to a brake system for a vehicle and a method of controlling the brake system.

An electro-mechanical brake (EMB) is a brake assembly that is actuated by electrical energy. For example, the EMB system generally provides braking of a vehicle by the use of a motor which becomes selectively energized in response to a signal of an electronic control unit (ECU) or a sensed depression of a brake input means. Generally, the EMB system may include a rotor, a brake caliper, and brake pads on opposing sides of the rotor. The brake caliper is slidably supported on pins secured to an anchor bracket fixed to a non-rotatable component of the vehicle, and includes one or more piston bores, each of which houses a piston that is movable along a piston axis during a brake apply and release of the brake apply. The brake pads are connected to one or more electrically actuated pistons for movement between a non-braking position and a braking position where the brake pads are moved into frictional engagement with the opposed braking surfaces of the rotor. For example, when an operator of the vehicle depresses a brake pedal, an actuator can move the piston into contact with one brake pad and then move one brake pad into contact with one side of the rotor, while another opposing brake pad is moved into contact with an opposing side of the rotor.

By way of example and without limitation, such an EMB system provides the desired braking in a substantially shorter amount of time than that which is provided by a conventional hydraulic braking system and allows each of the individual wheels of a vehicle or other selectively movable assembly to be selectively controlled, thereby enhancing the effectiveness of many operating strategies such as an anti-skid or anti-lock braking strategy or a strategy which is commonly referred to as an integrated vehicular dynamic strategy.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

Various embodiments of the present disclosure can provide a brake system configured to mix a brake request signal corresponding to a level of a brake request with a variable frequency and a variable amplitude (e.g. torque tickle) when generating a signal for controlling a brake. Accordingly, the effect of friction which directly impacts clamp accuracy can be reduced. And, the torque tickle added to the brake request signal can improve brake clamp accuracy as well as braking performance characteristics of the vehicle. Further, the brake can be accurately controlled so as not to require the force feedback sensor and enable vehicle clamp force accuracy targets to be met without the force feedback sensor.

According to some embodiments of the present disclosure, a brake system for a vehicle may comprise: one or more brakes configured to apply braking to one or more vehicle wheels; memory; and a processor configured to mix a brake request signal corresponding to a level of a brake request with a variable frequency and a variable amplitude to generate a signal for controlling the one or more brakes, wherein the variable frequency is retrieved from one or more predetermined frequencies stored in the memory, and the variable amplitude is calculated based on the level of the brake request.

The memory may be configured to store the one or more predetermined frequencies of a torque tickle; and the processor is configured to: receive the brake request signal corresponding to the level of the brake request, calculate an amplitude of the torque tickle based on the level of the brake request, retrieve a frequency of the torque tickle from the memory, and add a torque tickle signal having the calculated amplitude of the torque tickle and the retrieved frequency of the torque tickle to the brake request signal to generate the signal for controlling the one or more brakes.

The torque tickle may be periodic vibration motion.

The processor may be further configured to count time for performing the torque tickle, and add the torque tickle signal to the brake request signal for the counted time for performing the torque tickle.

The processor may be further configured to, in response to detection of decrease in the level of the brake request, initiate to count the time for performing the torque tickle.

The processor may be further configured to, in response to detection of increase in the level of the brake request, reset the counted time for performing the torque tickle to a preset value.

The processor may be further configured to, in response to detection that the level of the brake request is decreased, add the torque tickle signal having the calculated amplitude of the torque tickle and the retrieved frequency of the torque tickle to the brake request signal to generate the signal for controlling the one or more brakes.

The amplitude of the torque tickle may be calculated to be proportional to the brake request.

The one or more predetermined frequencies of the torque tickle stored in the memory may be between 20 Hz and 50 Hz.

The signal for controlling the one or more brakes may be a signal for controlling a torque generated by the one or more brakes.

The processor is configured to generate the torque tickle signal using a following equation:

$$Torque\_Tickle = Torque\_Tickle\_Amplitude * \sin(2*\pi*Torque\_Tickle\_Frequency*Timer\_Counter)$$

where Torque_Tickle is the torque tickle which to be added to the brake request signal, Torque_Tickle_Amplitude is the calculated amplitude of the torque tickle, Torque_Tickle_Frequency is the retrieved frequency of the torque tickle, and Timer_Counter is counted time for performing the torque tickle.

According to certain embodiments of the present disclosure, a method of controlling a brake system for a vehicle may comprise: receiving a brake request signal corresponding to a level of a brake request; retrieving a variable frequency, which is to be mixed with the brake request signal corresponding to the level of the brake request, from one or more predetermined frequencies stored in memory; calculating a variable amplitude, which is to be mixed with the brake request signal corresponding to the level of the brake request, based on the level of the brake request, and mixing the brake request signal corresponding to the level of the brake request with the retrieved variable frequency and the calculated variable amplitude to generate a signal for controlling one or more brakes configured to apply braking to one or more vehicle wheels.

The memory may be configured to store the one or more predetermined frequencies of a torque tickle, the calculating of the variable amplitude comprises calculating an amplitude of the torque tickle based on the level of the brake request, the retrieving of the variable frequency may comprise retrieving a frequency of the torque tickle from the one or more predetermined frequencies of the torque tickle stored in the memory, and the mixing of the brake request signal with the retrieved variable frequency and the calculated variable amplitude may comprise adding a torque tickle signal having the calculated amplitude of the torque tickle and the retrieved frequency of the torque tickle to the brake request signal to generate the signal for controlling the one or more brakes.

The torque tickle may be periodic vibration motion.

The method may further comprise counting time for performing the torque tickle, and adding the torque tickle signal to the brake request signal for the counted time for performing the torque tickle.

The method may further comprise, in response to detection of decrease in the level of the brake request, initiating to count the time for performing the torque tickle.

The method may further comprise, in response to detection of increase in the level of the brake request, resetting the time for performing the torque tickle to a preset value.

The amplitude of the torque tickle may be calculated to be proportional to the brake request.

The one or more predetermined frequencies of the torque tickle stored in the memory may be between 20 Hz and 501 Hz.

The method may further comprise generating the torque tickle signal using a following equation:

$$Torque\_Tickle = Torque\_Tickle\_Amplitude * \sin(2 * \pi * Torque\_Tickle\_Frequency * Timer\_Counter)$$

where Torque_Tickle is the torque tickle which to be added to the brake request signal, Torque_Tickle_Amplitude is the calculated amplitude of the torque tickle, Torque_Tickle_Frequency is the retrieved frequency of the torque tickle, and Timer_Counter is counted time for performing the torque tickle.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
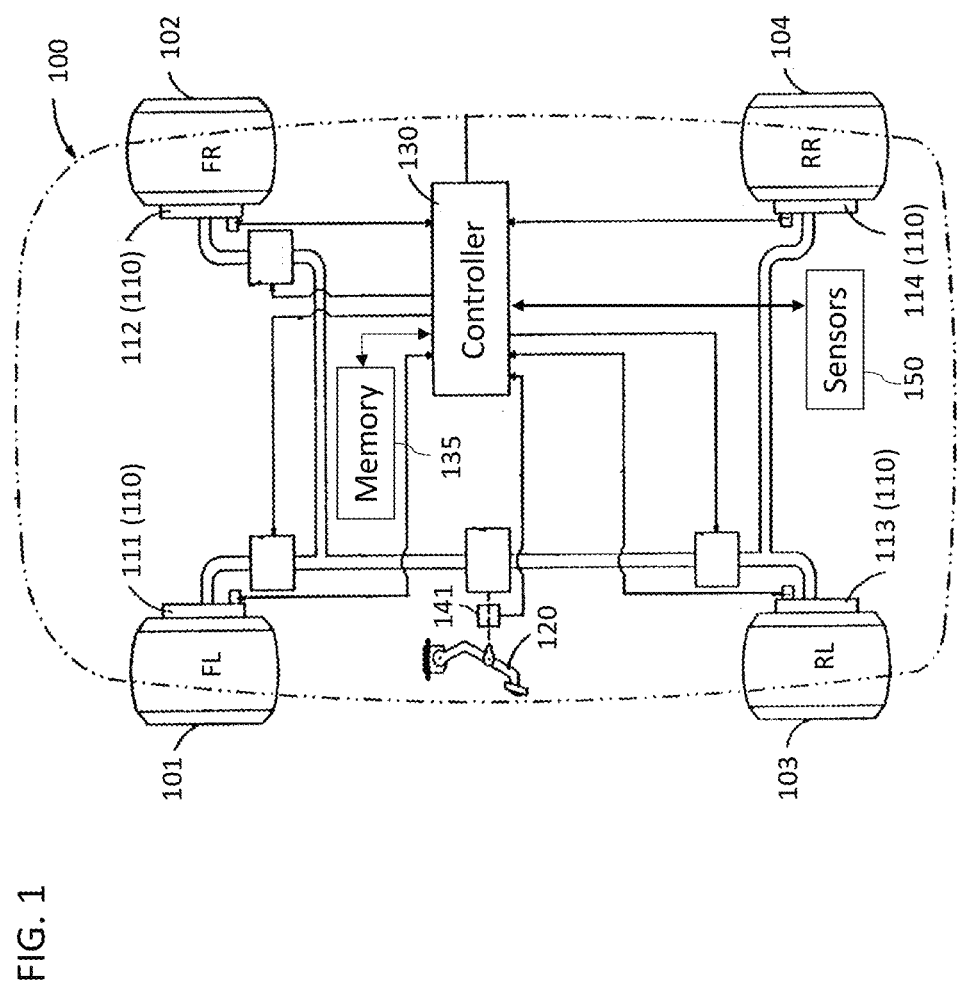
FIG. 1 is a schematic view of a vehicle including a brake system according to an embodiment of the present disclosure.

FIG. 1 is a schematic view of a vehicle including a brake system according to an embodiment of the present disclosure.

Referring to FIG. 1, a vehicle 100 may comprise a plurality of vehicle wheels. For example, the wheels of the vehicle 100 may include a front left (FL) wheel 101, a front right (FR) wheel 102, a rear left (RL) wheel 103, and a rear right (RR) wheel 104. The brake system may comprise brake assemblies 110, a controller 130, and one or more sensors 150.

Figure 7:
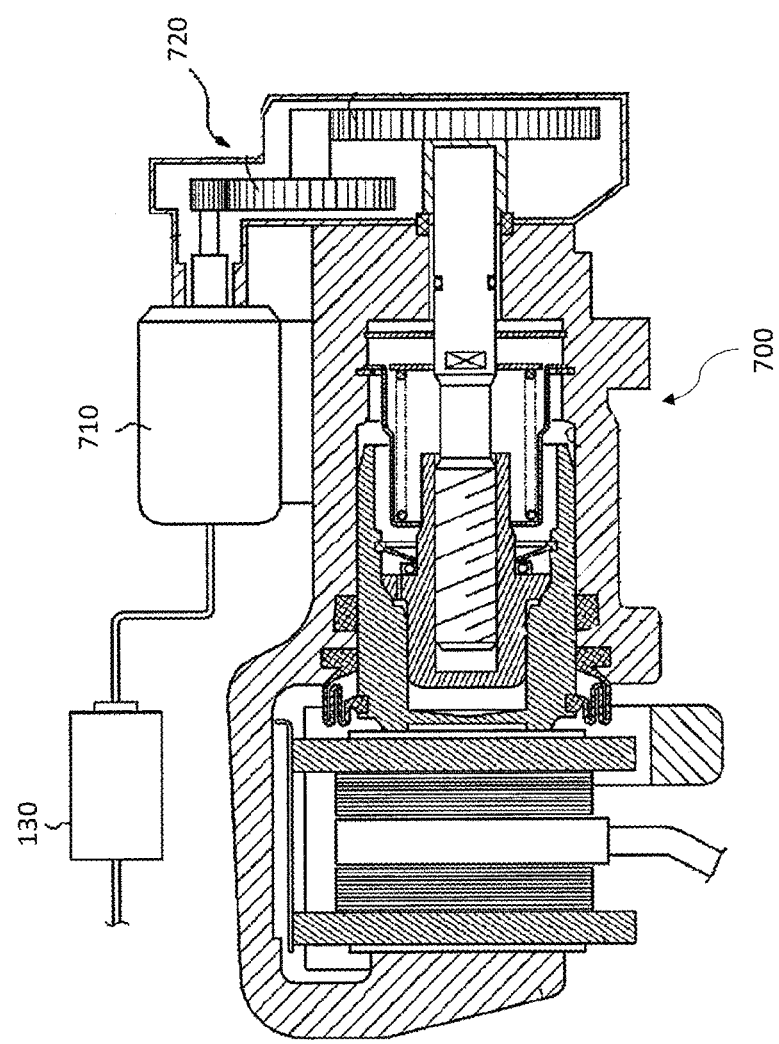
FIG. 7 is a cross-sectional diagram of a brake according to an embodiment of the present disclosure.

The brake assemblies 110 may include a plurality of brakes 111, 112, 113, 114 which are operably coupled to each of four vehicle wheels 101, 102, 103, 104. Each of the brakes 111, 112, 113, 114 may be configured to apply an individual brake force to a respective one of the vehicle wheels 101, 102, 103, 104. For example, the braking can be achieved by forcing the brake pad of the brake to the disc of the vehicle wheel. The brakes 111, 112, 113, 114 may be independently actuatable through a controller 130. One exemplary embodiment of the brake 111, 112, 113, 114 is illustrated in FIG. 7 included in U.S. Patent Application Publication No. 2013/0314222 which is assigned to the assignee of the present disclosure and which is hereby incorporated by reference into the present disclosure in its entirety. However, any type of the brakes can be applied to the present disclosure.

Operation of the brake assemblies 110 may involve a vehicle operator depressing a driver-manipulated brake pedal 120 which is sensed by a brake pedal sensor 141. The brake pedal sensor 141 monitors the position, movement exerted force, and/or state of the brake pedal 120 and provides the controller 130 with a brake request signal that is representative of a level of a brake request such as the requested brake torque (also known as a driver braking intent).

Additionally, the controller 130 may generate a brake request signal to control the brake assemblies 110 according to control algorithm, software, or instructions stored in memory, for example, but not limited to, self-driving software, Advanced Driver-Assistance Systems (ADAS), traction slip control, anti-lock brake control, electronic stability control and any other algorithm or computer-implemented system for controlling a vehicle automatically or assisting a vehicle operator.

Various sensors 150 may be associated with the controller 130 and may be used alone or in various combinations depending on the conditions. The sensors may include any combination of components, devices, modules, systems, and so on that measure wheel speed, wheel acceleration, vehicle speed, vehicle acceleration, frictional brake torque, regenerative brake torque, tire pressure, vehicle mass, yaw, yaw rate, steering angle, road grade, whether conditions, or any other vehicle operating parameters that can be used to control the vehicle 100. One or more of the sensors may be embodied in hardware, software, firmware, or some combination thereof, and may be electronically coupled to the controller 130 via an electronic connection, via other electronic components such as other devices, modules, and systems, via a vehicle communications bus or network, or via some other communication. Other sensors may be used to complement or verify determinations of other sensors. For example, some sensors may be used to check the image or radar signals, or vice versa.

The controller 130 may be programmed to perform various functions and control various outputs in response to information received from a number of sensors. The controller 130 is electrically connected to various elements of the vehicle 100, for example, but not limited to, the brake assemblies 110 including the brakes 111, 112, 113, 114, the sensors 150 and the memory 135. The controller 130 is configured to receive various input signals, for example, but not limited to, signals from a plurality of sensors installed in the vehicle 100. During the brake operation of the brake assembly 110, the controller 130 may continuously receive signals from the sensors 150, or may receive telemetry information from the sensors 150 after the braking event occurs. The controller 130 is configured to output control signals to the brake assemblies 110 to control the brakes 111, 112, 113, 114.

The controller 130 may be, for example, but not limited to, a device, using mechanical, hydraulic, pneumatic electronic techniques, and/or a microprocessor or computer, which monitors and physically alters the operating conditions of a given dynamical system. In one example, the controller 130 can include an Allen Bradley brand Programmable Logic Controller (PLC). The controller 130 may include one or more processors (for example, 210 of FIG. 2) for performing calculations to process input and/or output. The controller 130 may include a memory (for example, 240 of FIG. 2) for storing preset or predetermined values to control the brake system and values to be processed by the processor, or for storing the results of previous processing. The controller 130 may also be configured to accept input and output from a wide array of input and output devices for receiving or sending values. Such devices include other computers, keyboards, mice, visual displays, industrial equipment, and systems or machinery of all types and sizes. For example, the controller 130 can control a network or network interface to perform various network communications upon request. The network interface may be part of the controller 130, or characterized as separate and remote from the controller 130. The controller 130 may be a single, physical, computing device having similar functions with a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller 130 may also be connected to a wider network such as the Internet. Thus, the controller 130 may include one or more physical processors or other computing devices or circuitry, and may also include any suitable type of memory. The controller 130 may also be a virtual computing platform having an unknown or fluctuating number of physical processors and memories or memory devices. The controller 130 may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

The memory 135 store characteristic data, information, values (parameters, curves, maps, patterns, tables and/or thresholds), for example, brake characteristic parameters for controlling each of the brakes 111, 112, 113, 114. The brake characteristic parameters may include parameters related to brake force and/or the time of braking for controlling each of the brakes 111, 112, 113, 114. For instance, initial parameters are decided on the bases of results of having tested various parameters in a hypothetical test environment and stored in the memory 135. The controller 130 can change the initial parameters by calibration operations. The memory 135 may be a stand-alone memory associated with the controller 130 as shown in FIG. 1 or may be incorporated within the controller 130 as shown in FIG. 2.

Figure 2:
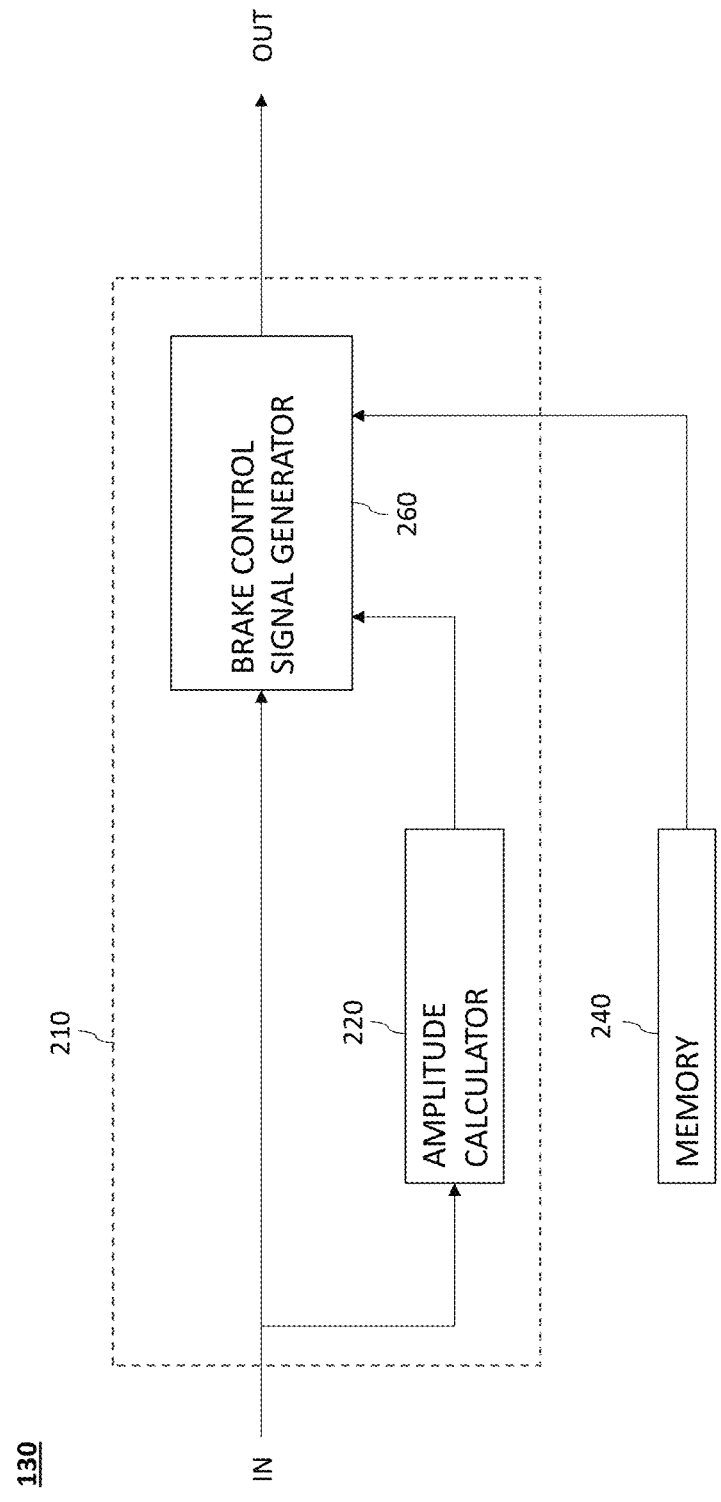
FIG. 2 is a block diagram of a controller of a brake system according to an embodiment of the present disclosure.
Figure 3:
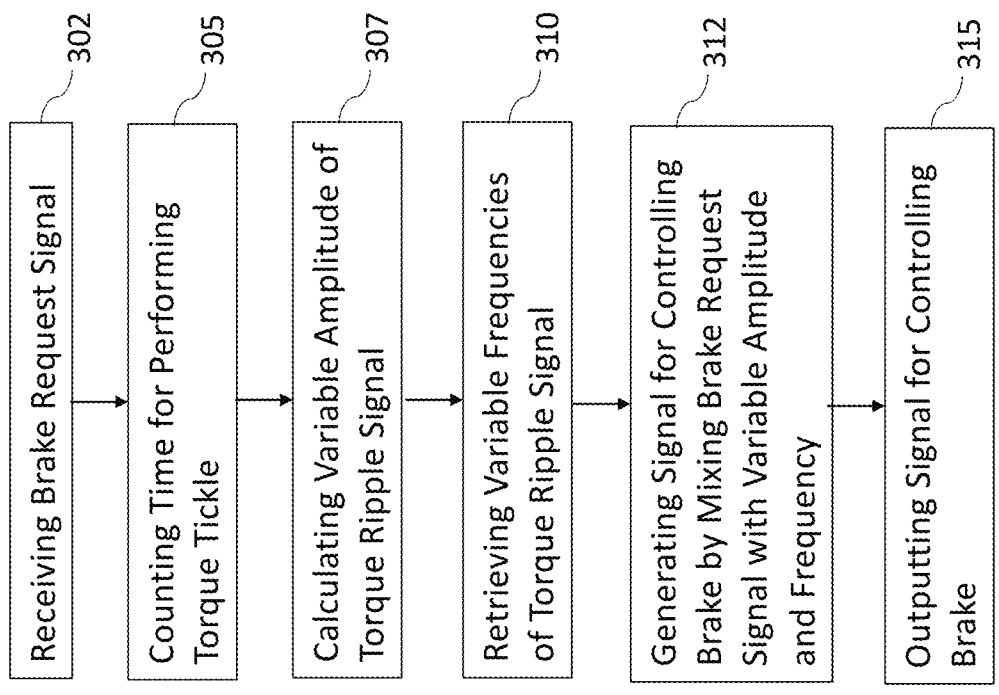
FIG. 3 is a flow diagram illustrating a method for controlling a brake system according to an embodiment of the present disclosure.

FIG. 2 is a block diagram of a controller of a brake system according to an embodiment of the present disclosure, and FIG. 3 is a flow diagram illustrating a method for controlling a brake system according to an embodiment of the present disclosure.

The controller 130 of FIG. 1 may comprise a processor 210 and a memory 240. However, the memory 240 may not be included in the controller 130. For example, the memory 240 of FIG. 2 may be implemented as the memory 135 of FIG. 1 which is a stand-alone memory associated with the controller 130. Alternatively, the memory 240 may be integrated into the processor 210.

The configurations and operations of the memory 240 of FIG. 2 may be the same or similar to those of the memory 135 of FIG. 1 described above. The same descriptions of the memory 240 of FIG. 2 will be omitted.

The controller 130 may be a central controller as illustrated in FIG. 1, but the present disclosure is not limited thereto. Alternatively, the controller 130 can be implemented as a plurality of controllers with a storage medium and a suitable amount of programmable memory, which are capable of storing and executing one or more algorithms or methods to effect control of the brakes 111, 112, 113, 114, and each brake 111, 112, 113, 114 may have a respective controller therein, or may be operably connected to a respective controller controlling a corresponding brake. For example, each controller may be a controller located at the EMB unit at a respective corner of the vehicle 100. However, one or more controllers according to the present disclosure can be disposed at any suitable location of the vehicle 100 and can be implemented in any suitable manner.

The processor 210 may be a computer processor where data and signal processing logic and control are included on one or more integrated circuits. The processor 210 may contain the arithmetic, logic, and control circuitry required to perform the functions of a central processing unit (CPU). The processor 210 comprises, for example, but not limited to, a microprocessor having a large scale integrated circuit (LSI) including a ROM in which is stored various constants and a control program for controlling the brake system. The processor 210 may include the CPU for reading out control programs from the ROM so as to execute required operations, and a RAM which temporarily stores various data related to the operations to be executed within the CPU and which allows the CPU to read out data stored therein. The processor 210 may comprise a clock generator which generates clock pluses in response to which various operations are executed in the processor 210 and input-output devices for controlling various input-output signals to and from the processor 210.

At step 302, the processor 210 receives a brake request signal IN. The brake request signal IN is generated to correspond to a level of a brake request. The brake request signal IN may indicate a brake torque demanded by the driver. Specifically, the brake request signal IN has a magnitude corresponding to the level of braking force inputted by the driver, which can be sensed by the brake pedal sensor 141 of FIG. 1. Other techniques and methods can be used for generating the brake request signal IN. For instance, the brake request signal IN corresponding to the level of the brake request may be generated according to driving assistant or self-driving algorithms or software instructions for controlling the vehicle 100 and/or the brake assemblies 110, such as self-driving software, Advanced Driver-Assistance Systems (ADAS), traction slip control, anti-lock brake control, electronic stability control and any other algorithm or computer-implemented system for controlling a vehicle automatically or assisting a vehicle operator.

The processor 210 counts time for performing torque tickle (step 305). The torque tickle may be periodic vibration motion. For example, the torque tickle is continuous quick, slight shaking movement. The torque tickle may have a variable amplitude and a variable frequency which will be described in further detail later.

Figure 4:
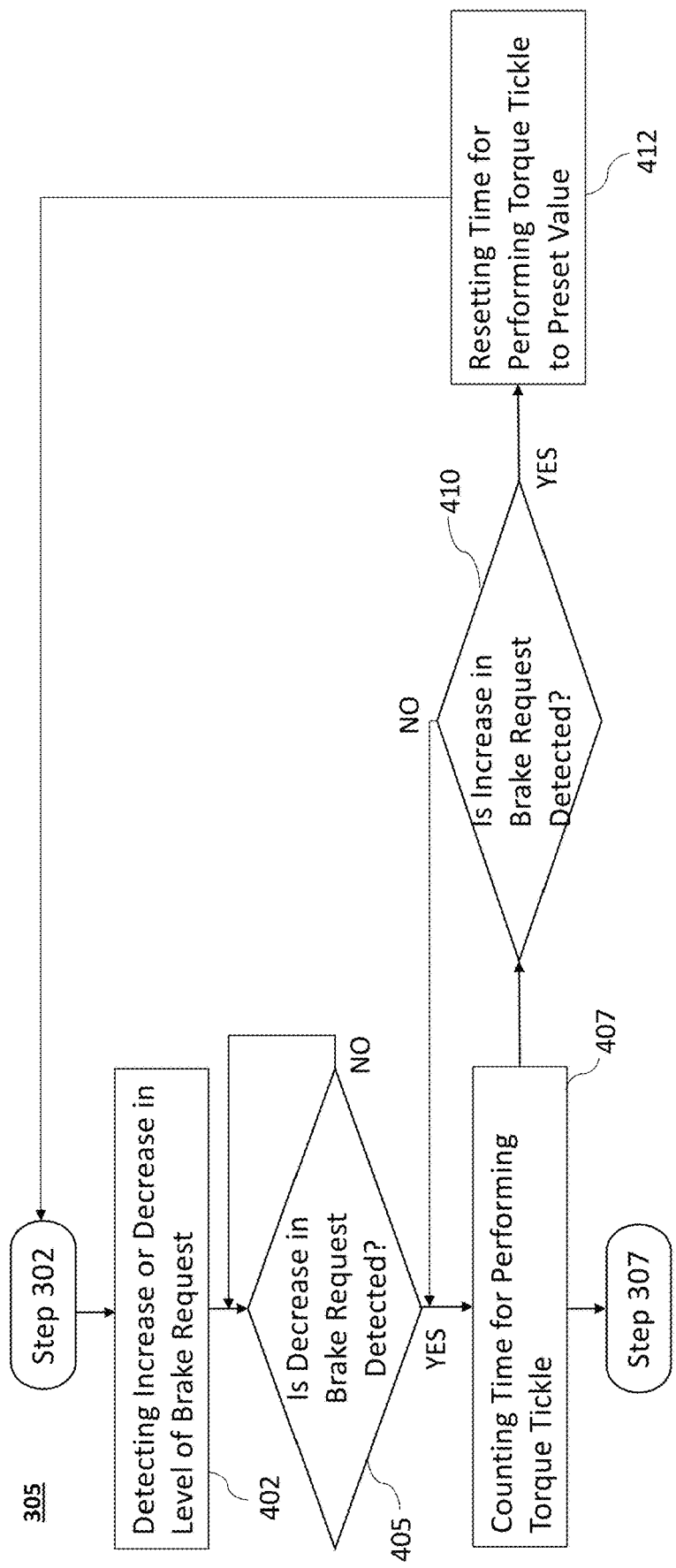
FIG. 4 is a flow diagram for illustrating steps for counting time for performing torque tickle according to an embodiment of the present disclosure.

A detailed exemplary embodiment of step 305 is described in FIG. 4. FIG. 4 is a flow diagram for illustrating steps for counting time for performing the torque tickle according to an embodiment of the present disclosure. In the exemplary embodiment of FIG. 4, the processor 210 detects increase and/or decrease in the level of the brake request signal IN (step 402). If the processor 210 detects that the level of the brake request signal IN decreases (step 405), the processor 210 initiates to count time for performing the torque tickle (step 407). The time for performing the torque tickle may be counted until the decrease in the level of the brake request signal IN stops (e.g. the level of the brake request increases or is not changed). Then, if the increase in the level of the brake request is detected (step 410), the processor 210 resets the counted time for performing the torque tickle to a preset value, for example, but not limited to, zero (0) (step 412).

Therefore, according to some exemplary embodiments of the present disclosure, the torque tickle can be mixed with a commanded brake torque only when the level of the brake request is decreasing, while the brake torque is applied to the vehicle wheel such as a rotor without the torque tickle during the increase in the level of the brake request.

Returning to FIGS. 2 and 3, an amplitude calculator 220 of the processor 210 calculates a variable amplitude of a signal of a torque tickle which is to be mixed with the brake request signal IN (step 307). The variable amplitude of the signal of the torque tickle can be calculated based the level of the brake request. For example, the variable amplitude of the signal of the torque tickle can be proportional to the level of the brake request. The amplitude of the torque tickle can be calculated according to Equation (1):

$$\text{Torque\_Tickle\_Amplitude} = (\text{Brake\_Request}) * (\text{Dither\_Gain}) \quad (1)$$

where: Torque_Tickle_Amplitude is an amplitude of torque tickle, Brake_Request is the level of a brake request, and Dither_Gain is a tunable parameter (e.g. a parameter predetermined through experimental testing and/or changed thereafter by calibration operations).

The memory 240 is configured to store one or more predetermined or preset frequencies of a signal of a torque tickle. The predetermined or preset frequencies of the signal of the torque tickle may be a tunable parameter which is predetermined through experimental testing and/or changed thereafter by calibration operations. The predetermined or preset frequencies of the signal of the torque tickle may be set to between 20 Hz and 50 Hz. The frequency range between 20 Hz and 50 Hz of the signal of the torque tickle can improve accuracy of brake clamp force relative to the brake request. At step 310, the processor 210 retrieves from the memory 240 one of the predetermined frequencies of the signal of the torque tickle which is to be mixed with the brake request signal IN.

A brake control signal generator 260 of the processor 210 generates a signal OUT for controlling the brake 111, 112, 113, 114 by mixing the brake request signal IN with the variable amplitude, calculated by the amplitude calculator 220 of the processor 210, and the variable frequency, retrieved from the memory 240 (step 312). For example, the signal OUT for controlling the brake 111, 112, 113, 114 may be a signal for controlling a torque which is applied to the vehicle wheel 101, 102, 103, 104 by the brake 111, 112, 113, 114. The brake control signal generator 260 of the processor 210 may add a torque tickle signal having the amplitude, calculated by the amplitude calculator 220 of the processor 210 at step 307, and the frequency, retrieved from the memory 240 at step 310, to the brake request signal IN. For example, the torque tickle signal can be generated using Equation (2):

$$\text{Torque\_Tickle} = \text{Torque\_Tickle\_Amplitude} * \sin(2*\pi*\text{Torque\_Tickle\_Frequency}*\text{Timer\_Counter}) \quad (2)$$

where Torque_Tickle is torque tickle which is to be added to a brake request signal, Torque_Tickle_Amplitude is the amplitude of the torque tickle calculated at step 307, Torque_Tickle_Frequency is the frequency of the torque tickle retrieved at step 310, and Timer_Counter is time for performing the torque tickle which is counted at step 305.

The signal of the torque tickle generated using Equation (2) is added to the brake request signal IN to generate the signal OUT for controlling the brake 111, 112, 113, 114. For example, the signal OUT for controlling the brake 111, 112, 113, 114 can represent a brake torque generated by an actuator 700 of FIG. 7 including a motor 710 and a gear assembly 720. In this case, the signal for controlling the brake 111, 112, 113, 114 can be generated according to Equation (3):

$$\text{Actuator\_Command} = \text{Commanded\_Torque} + \text{Torque\_Tickle\_Amplitude} * \sin(2 * \pi * \text{Torque\_Tickle\_Frequency} * \text{Timer\_Counter}) \quad (3)$$

where Actuator_Command is a torque generated by an actuator of a brake, Commanded_Torque is a commanded clamping force to be applied to a rotor of a vehicle wheel, Torque_Tickle_Amplitude is the amplitude of the torque tickle, Torque_Tickle_Frequency is the frequency of the torque tickle, and Timer_Counter is counted time for performing the torque tickle.

Here, Commanded_Torque of Equation (3) can be calculated using Equation (4):

$$\text{Commanded\_Torque} = \text{Brake\_Request} / (\text{Gear\_Ratio} * \text{System\_Efficiency}) \quad (4)$$

where Commanded_Torque is a commanded clamping force, Brake_Request is the level of a brake request, Gear_Ratio is a gear ratio of the brake, and System Efficiency is efficiency of the actuator of the brake.

Figure 5:
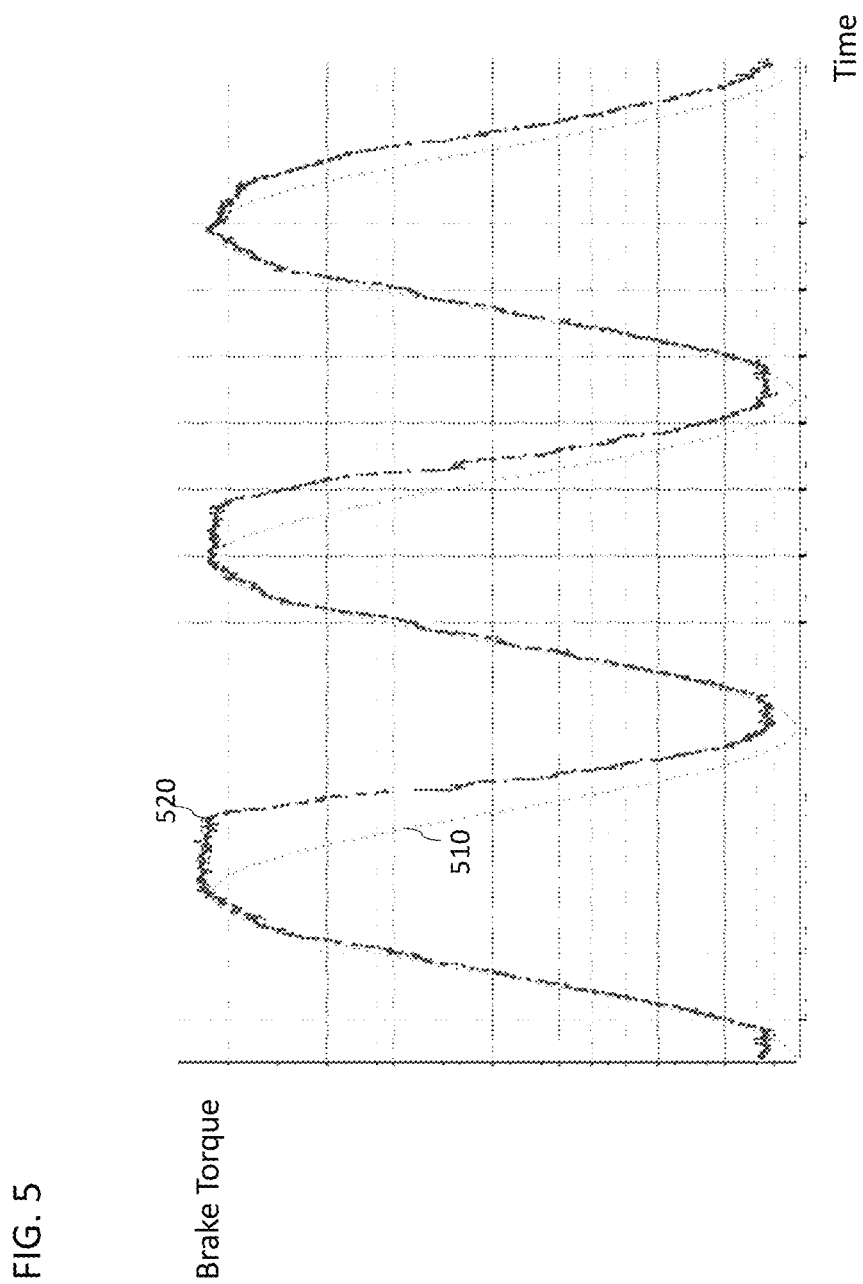
FIG. 5 is a graph for illustrating an example of a brake request signal and a signal in which torque tickle is mixed with the brake request signal according to an embodiment of the present disclosure.

Examples of a brake request signal and a signal for controlling a brake, in which torque tickle having a variable frequency and a variable amplitude is mixed with the brake request signal, are illustrated in FIG. 5. A line 510 represents the brake request signal IN, and a line 520 represents the signal OUT for controlling the brake 111, 112, 113, 114. When receiving the brake request signal IN represented by the line 510, the processor 210 generates the signal OUT for controlling the brake 111, 112, 113, 114, represented by the line 520, by mixing the torque tickle having the variable frequency and the variable amplitude with the brake request signal IN in a way described above. In the example illustrated in FIG. 5, the torque tickle is mixed with the brake request signal IN only when the level of the brake request is decreasing, but the torque tickle was not blended with the brake request signal IN during the increase in the level of the brake request.

At step 315, the processor 210 outputs the signal OUT for controlling the brake 111, 112, 113, 114 generated at step 312 so that the controller 130 can control the brake 111, 112, 113, 114 using the signal OUT for controlling the brake 111, 112, 113, 114 for the time for performing torque tickle, counted at step 305. The processor 210 can command the actuator 710 of the brake 111, 112, 113, 114 to cause the brake 111, 112, 113, 114 to produce the brake torque requested by the brake request received at step 302.

Figure 6:
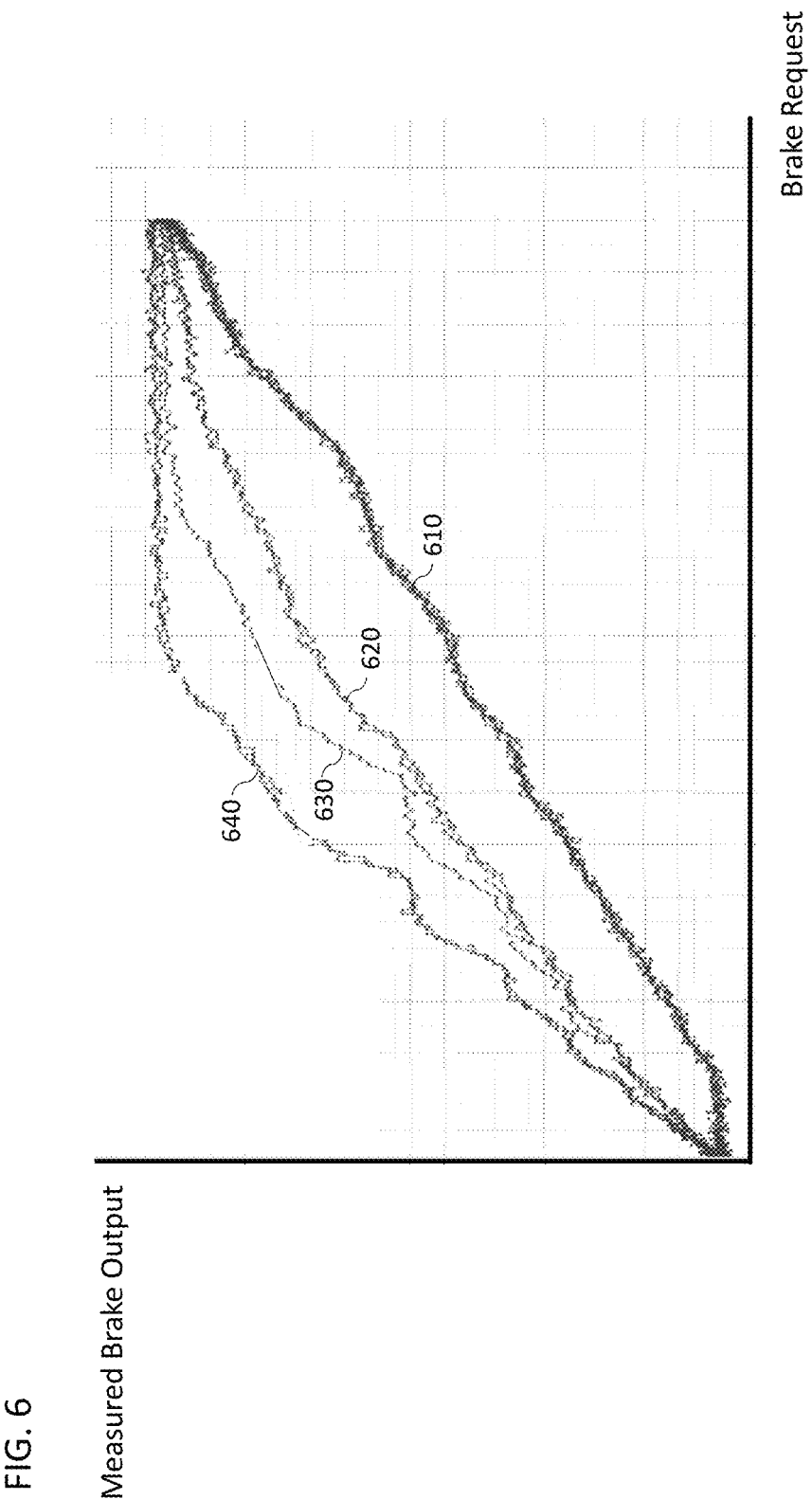
FIG. 6 is a graph for showing hysteresis loops of a brake cycle with and without torque tickle.

FIG. 6 shows that certain embodiments of the present disclosure generating a signal for controlling a brake by mixing a brake request signal corresponding to a level of a brake request with a variable frequency and a variable amplitude (e.g. torque tickle) can reduce system hysteresis and improve accuracy of brake torque control to an original clamp force request. A line 610 represents the apply portion of the braking cycle in which the brake torque increases. As described above, some embodiments of the present disclosure apply the brake torque to the vehicle wheel such as a rotor without the torque tickle during the increase in the level of brake request. A line 620 represents a hysteresis loop of the release portion of the braking cycle with the torque tickle, a line 630 represents a braking cycle where the torque tickle starts to be performed at a mid-cycle, and a line 640 represents a hysteresis loop of the release portion of the braking cycle without the torque tickle. The line 620 representing a hysteresis loop of the release portion of the braking cycle with the torque tickle is positioned closer to the line 610 representing the apply portion of the braking cycle than the line 640 representing a hysteresis loop of the release portion of the braking cycle without the torque tickle. Thus, by blending the torque tickle with the commanded brake torque, the hysteresis during the brake release can be reduced.

According to some embodiments of the present disclosure, by mixing a brake request signal corresponding to a level of a brake request with a variable frequency and a variable amplitude (e.g. torque tickle) when generating a signal for controlling a brake, the effect of friction which directly impacts clamp accuracy can be reduced. Therefore, the torque tickle added to the brake request signal can improve brake clamp accuracy as well as braking performance characteristics of the vehicle.

A conventional brake system requires a force feedback sensor, and therefore it may have delayed feedback due to a signal of the force feedback sensor. However, according to certain embodiments of the present disclosure, by adding a signal of a torque tickle having a variable frequency and a variable amplitude to a brake request signal in order to generate a signal for controlling a brake, a brake system can accurately control a brake so as not to require the force feedback sensor and enable vehicle clamp force accuracy targets to be met without the force feedback sensor. Due to the unnecessity of the force feedback sensor in an electric brake system of some embodiments of the present disclosure, the electrical architecture of the electric brake system can be simplified and manufacturing cost of the brake system of the vehicle can be reduced. Furthermore, because of reduced latency in applying clamp force relative to a command of clamp force, system reliability and braking performance of the brake control system according to certain embodiments of the present disclosure can be improved.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. The amplitude calculator 220 and the brake control signal generator 260 may be a hardware based unit, a software based unit or a combination of hardware and software. The hardware based unit may include self-contained components such as chipsets, specialized circuitry and one or more memory devices, while the software-based unit may be part of a program code or linked to the program code containing specific programed instructions, which may be loaded in memory. The amplitude calculator 220 and the brake control signal generator 260 may be designed to implement or execute one or more particular functions or routines described above.

Embodiments of the present disclosure may comprise or utilize a special purpose or general-purpose computer including computer hardware, such as, for example, one or more processors and system memory, as discussed in greater detail above. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Those skilled in the art will appreciate that the present disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The present disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present disclosure can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the Specification and Claims to refer to particular system components. As one skilled in the art will appreciate, components may be referred to by different names. The present disclosure does not intend to distinguish between components that differ in name, but not function.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A brake system for a vehicle, comprising:
one or more brakes configured to apply braking to one or more vehicle wheels;
memory; and
a processor configured to mix a brake request signal corresponding to a level of a brake request with a variable frequency and a variable amplitude to generate a signal for controlling the one or more brakes, wherein the variable frequency is retrieved from one or more predetermined frequencies stored in the memory, and the variable amplitude is calculated based on the level of the brake request, wherein the processor is configured to count time for performing the torque tickle in response to detection of the level of the brake request, and add the torque tickle signal to the brake request signal for the counted time for performing the torque tickle.

2. The brake system according to claim 1, wherein:
the memory is configured to store the one or more predetermined frequencies of a torque tickle; and
the processor is configured to:
receive the brake request signal corresponding to the level of the brake request,
calculate an amplitude of the torque tickle based on the level of the brake request,
retrieve a frequency of the torque tickle from the memory, and
add a torque tickle signal having the calculated amplitude of the torque tickle and the retrieved frequency of the torque tickle to the brake request signal to generate the signal for controlling the one or more brakes.

3. The brake system according to claim 2, wherein the torque tickle is periodic vibration motion.

4. The brake system according to claim 2, wherein the processor is further configured to, in response to detection that the level of the brake request is decreased, add the torque tickle signal having the calculated amplitude of the torque tickle and the retrieved frequency of the torque tickle to the brake request signal to generate the signal for controlling the one or more brakes.

5. The brake system according to claim 2, wherein the amplitude of the torque tickle is calculated to be proportional to the brake request.

6. The brake system according to claim 2, wherein the one or more predetermined frequencies of the torque tickle stored in the memory are between 20 Hz and 50 Hz.

7. The brake system according to claim 2, wherein the processor is configured to generate the torque tickle signal using a following equation:

$$\text{Torque\_Tickle} = \text{Torque\_Tickle\_Amplitude} * \sin(2*\pi*\text{Torque\_Tickle\_Frequency}*\text{Timer\_Counter})$$

where Torque_Tickle is the torque tickle which to be added to the brake request signal, Torque_Tickle_Amplitude is the calculated amplitude of the torque tickle, Torque_Tickle_Frequency is the retrieved frequency of the torque tickle, and Timer Counter is counted time for performing the torque tickle.

8. The brake system according to claim 1, wherein the processor is further configured to, in response to detection of decrease in the level of the brake request, initiate to count the time for performing the torque tickle.

9. The brake system according to claim 1, wherein the processor is further configured to, in response to detection of increase in the level of the brake request, reset the counted time for performing the torque tickle to a preset value.

10. The brake system according to claim 1, wherein the signal for controlling the one or more brakes is a signal for controlling a torque generated by the one or more brakes.

11. A method of controlling a brake system for a vehicle, comprising:
receiving a brake request signal corresponding to a level of a brake request;
retrieving a variable frequency, which is to be mixed with the brake request signal corresponding to the level of the brake request, from one or more predetermined frequencies stored in memory;
calculating a variable amplitude, which is to be mixed with the brake request signal corresponding to the level of the brake request, based on the level of the brake request; and
mixing the brake request signal corresponding to the level of the brake request with the retrieved variable frequency and the calculated variable amplitude to generate a signal for controlling one or more brakes configured to apply braking to one or more vehicle wheels,
wherein the method further comprises:
counting time for performing the torque tickle in response to detection of the level of the brake request, and
adding the torque tickle signal to the brake request signal for the counted time for performing the torque tickle.

12. The method according to claim 11, wherein:
the memory is configured to store the one or more predetermined frequencies of a torque tickle,
the calculating of the variable amplitude comprises calculating an amplitude of the torque tickle based on the level of the brake request, the retrieving of the variable frequency comprises retrieving a frequency of the torque tickle from the one or more predetermined frequencies of the torque tickle stored in the memory, and
the mixing of the brake request signal with the retrieved variable frequency and the calculated variable amplitude comprises adding a torque tickle signal having the calculated amplitude of the torque tickle and the retrieved frequency of the torque tickle to the brake request signal to generate the signal for controlling the one or more brakes.

13. The method according to claim 12, wherein the torque tickle is periodic vibration motion.

14. The method according to claim 12, wherein the amplitude of the torque tickle is calculated to be proportional to the brake request.

15. The method according to claim 12, wherein the one or more predetermined frequencies of the torque tickle stored in the memory are between 20 Hz and 50 Hz.

16. The method according to claim 12, further comprising generating the torque tickle signal using a following equation:

$$\text{Torque\_Tickle} = \text{Torque\_Tickle\_Amplitude} * \sin(2*\pi*\text{Torque\_Tickle\_Frequency}*\text{Timer\_Counter})$$

where Torque Tickle is the torque tickle which to be added to the brake request signal, Torque_Tickle_Amplitude is the calculated amplitude of the torque tickle, Torque_Tickle_Frequency is the retrieved frequency of the torque tickle, and Timer_Counter is counted time for performing the torque tickle.

17. The method according to claim 11, further comprising, in response to detection of decrease in the level of the brake request, initiating to count the time for performing the torque tickle.

18. The method according to claim 11, further comprising, in response to detection of increase in the level of the brake request, resetting the time for performing the torque tickle to a preset value.

* * * * *